(12) United States Patent
Oguri et al.

(10) Patent No.: US 11,351,997 B2
(45) Date of Patent: Jun. 7, 2022

(54) COLLISION PREDICTION APPARATUS AND COLLISION PREDICTION METHOD

(71) Applicant: DENSO CORPORATION, Kariya (JP)

(72) Inventors: Takaharu Oguri, Kariya (JP); Yosuke Ito, Kariya (JP); Kei Kamiya, Kariya (JP); Ryo Takaki, Kariya (JP); Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 238 days.

(21) Appl. No.: 16/727,536

(22) Filed: Dec. 26, 2019

(65) Prior Publication Data

US 2020/0130683 A1 Apr. 30, 2020

Related U.S. Application Data

(63) Continuation of application No. PCT/JP2018/016260, filed on Apr. 20, 2018.

(30) Foreign Application Priority Data

Jun. 29, 2017 (JP) .............................. JP2017-127191

(51) Int. Cl.
*B60W 30/08* (2012.01)
*B60W 30/095* (2012.01)
*B60Q 9/00* (2006.01)
*B60W 30/09* (2012.01)
*G08G 1/16* (2006.01)

(52) U.S. Cl.
CPC ......... *B60W 30/0956* (2013.01); *B60Q 9/008* (2013.01); *B60W 30/09* (2013.01); *B60W 2420/42* (2013.01); *B60W 2420/52* (2013.01); *B60W 2520/06* (2013.01); *B60W 2520/10* (2013.01); *B60W 2520/14* (2013.01);
(Continued)

(58) Field of Classification Search
CPC ............. B60W 30/09; B60W 30/0956; B60W 2554/4048; G08G 1/16
See application file for complete search history.

(56) References Cited

U.S. PATENT DOCUMENTS

2009/0303026 A1* 12/2009 Broggi .................... G01S 17/86
340/435
2010/0121561 A1  5/2010 Kodaira et al.
(Continued)

FOREIGN PATENT DOCUMENTS

JP       2013-24709 A    2/2013
JP       2013-024709 A   2/2013
(Continued)

*Primary Examiner* — Anshul Sood
(74) *Attorney, Agent, or Firm* — Maschoff Brennan

(57) ABSTRACT

The collision prediction apparatus is installed in a vehicle and predicts a collision between a moving object and the vehicle. The collision predict apparatus includes a vehicle path estimation section, a moving object path estimation section, an obstruction specifying section, a direction change information acquisition section, a moving object extraction area setting section, and a collision predict section. The moving object extraction area setting section sets, as a moving object extraction area, an area that is in the vicinity of an obstruction and is near an outer periphery of the obstruction facing a path of the vehicle after change of a traveling direction indicated by direction change information.

11 Claims, 10 Drawing Sheets

(52) U.S. Cl.
CPC ..... *B60W 2540/18* (2013.01); *B60W 2552/05* (2020.02); *B60W 2555/60* (2020.02); *G08G 1/16* (2013.01)

(56) References Cited

U.S. PATENT DOCUMENTS

| | | | |
|---|---|---|---|
| 2014/0152488 A1* | 6/2014 | Baba | G01S 13/867 |
| | | | 342/70 |
| 2014/0180568 A1* | 6/2014 | Nagata | B60W 30/18154 |
| | | | 701/301 |
| 2014/0324330 A1 | 10/2014 | Minemura et al. | |
| 2017/0154227 A1* | 6/2017 | Moritani | G08G 1/056 |
| 2017/0193384 A1* | 7/2017 | Mudalige | G08G 1/166 |

FOREIGN PATENT DOCUMENTS

| | | |
|---|---|---|
| JP | 5729416 B1 | 6/2013 |
| JP | 2015-203922 A | 11/2015 |
| JP | 2016122308 A | 7/2016 |
| WO | 2016/014198 A1 | 6/2016 |

\* cited by examiner

COLLISION PREDICTION APPARATUS AND COLLISION PREDICTION METHOD

CROSS-REFERENCE TO RELATED APPLICATION

The present application is based on and claims the benefit of priority from earlier Japanese Patent Application No. 2017-127191 filed Jun. 29, 2017, the description of which is incorporated herein by reference.

BACKGROUND

Technical Field

The present disclosure relates to prediction of a collision between a vehicle and a moving object.

Related Art

In order that an own vehicle can avoid a collision with a moving object, for example, a pedestrian, a bicycle, or another vehicle, various techniques for estimating a movement path of the moving object and predicting a probability of a collision between the own vehicle and the moving have been proposed. In such collision prediction, positions of the moving object are measured for a long time period by using a camera or a millimeter wave radar, thereby estimating a movement path of the moving object accurately and improving accuracy in predicting a probability of a collision. However, when a moving object suddenly appears from behind an obstruction such as a parked vehicle, if it takes a long time to predict a collision, a response operation such as generating an alarm may be delayed. Hence, a method is proposed in which when an obstruction is present, and a moving object is detected in the vicinity of the obstruction, conditions used for predicting a collision (a threshold for determining that a collision will occur) are decreased compared with a case where a moving object is detected when no obstruction is present.

SUMMARY

An embodiment of the present disclosure provides collision prediction apparatus that is installed in a vehicle and predicts a collision between a moving object and the vehicle. The apparatus includes: a vehicle path estimation section that estimates a path of the vehicle; a moving object path estimation section that estimates a path of the moving object based on information obtained from a first sensor in time series and used for recognizing the moving object; an obstruction specifying section that specifies a position and size of an obstruction present in a traveling direction of the vehicle with respect to the vehicle; a direction change information acquisition section that acquires direction change information indicating a change of the traveling direction; a moving object extraction area setting section that sets a moving object extraction area with reference to the position and size of the obstruction by using the position and size of the specified obstruction and the acquired direction change information; and a collision prediction section that determines whether a collision will occur between the vehicle and the moving object by using the estimated path of the vehicle, the estimated path of the moving object, and the acquired direction change information, when the moving object is recognized in the moving object extraction area based on the information obtained from the first sensor. The moving object extraction area setting section sets, as the moving object extraction area, an area that is in the vicinity of the obstruction and is near an outer periphery of the obstruction facing the path of the vehicle after the change of the traveling direction indicated by the direction change information.

DETAILED DESCRIPTION OF THE PREFERRED EMBODIMENTS

Figure 1:
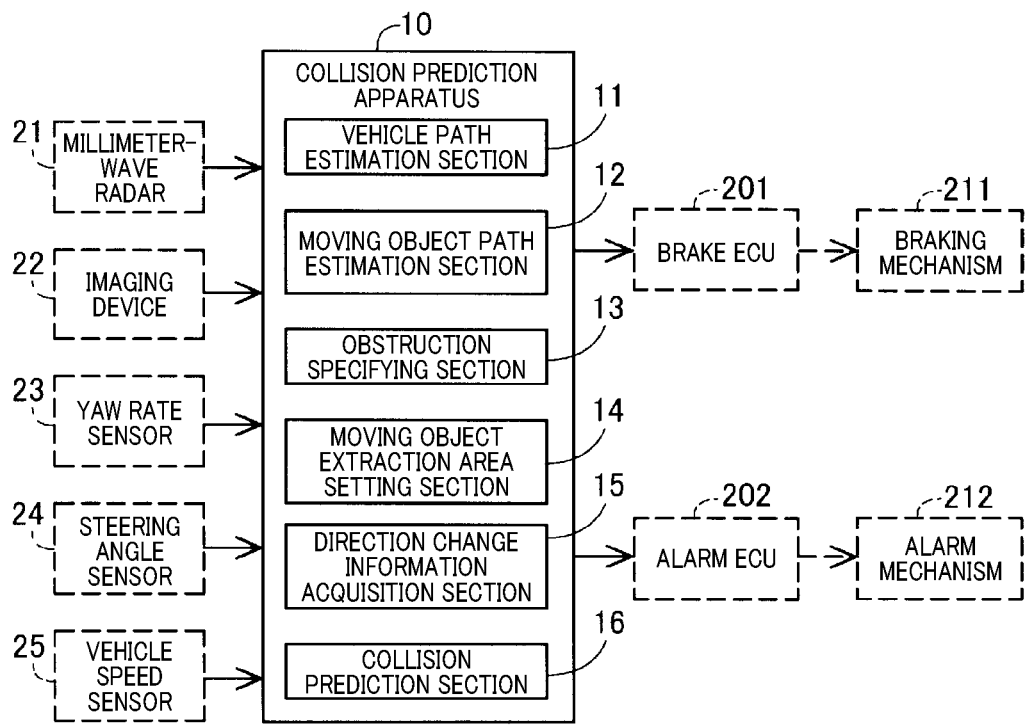
FIG. 1 is a block diagram illustrating a configuration of a collision prediction apparatus according to an embodiment of the present disclosure.

In order that an own vehicle can avoid a collision with a moving object, for example, a pedestrian, a bicycle, or another vehicle, various techniques for estimating a movement path of the moving object and predicting a probability of a collision between the own vehicle and the moving have been proposed. In such collision prediction, positions of the moving object are measured for a long time period by using a camera or a millimeter wave radar, thereby estimating a movement path of the moving object accurately and improving accuracy in predicting a probability of a collision. However, when a moving object suddenly appears from behind an obstruction such as a parked vehicle, if it takes a long time to predict a collision, a response operation such as generating an alarm may be delayed. Hence, a method is proposed in which when an obstruction is present, and a moving object is detected in the vicinity of the obstruction, conditions used for predicting a collision (a threshold for determining that a collision will occur) are decreased compared with a case where a moving object is detected when no obstruction is present. Japanese patent No. 5729416 discloses a method in which when a pedestrian is found in a predetermined area set in the vicinity of a stopped vehicle, which is an obstruction, reference conditions used for collision prediction (collision determination) are decreased to predict a collision in a shorter time. In addition, Japanese patent No. 5729416 discloses, as decrease in the reference conditions, for example, reducing the number of images (the number of frames) used when a path of a moving object is obtained, compared with other cases.

When a relative positional relation between the path of an own vehicle and the obstruction is changed because the own vehicle has performed steering to change the traveling direction, the own vehicle may collide with a moving object that is likely to be predicted not to collide with the own vehicle according to the originally estimated path of the own vehicle. However, in the method in Japanese patent No. 5729416, the predetermined area for detecting a moving object is fixed with reference to the position and the size of the obstruction. Thus, even when the traveling direction of the vehicle is changed as described above, reference conditions used for collision prediction (collision determination) are not decreased.

Such a problem may arise not only when the predetermined area is used as an area for a determination whether the reference conditions used for collision prediction (collision determination) are decreased as in Japanese patent No. 5729416, but when the predetermined area is used as an area for a determination whether collision prediction is performed. That is, even in a configuration in which collision prediction is performed when a moving object is found in a predetermined area, and the collision prediction is not performed when a moving object is found in an area other than the predetermined area, the above problem may arise. Hence, a technique is desired which can perform collision prediction with high accuracy even when the traveling direction of the vehicle changes.

A. First Embodiment

A1. Configuration of Apparatus

A collision prediction apparatus 10 of the first embodiment shown in FIG. 1 is installed in a vehicle and predicts a collision between the vehicle and a moving object. In the present embodiment, the moving object includes movable objects and living beings such as a pedestrian, a bicycle, a motorbike, and an unmanned vehicle. In the present embodiment, the vehicle in which the collision prediction apparatus 10 is installed may be referred to as an own vehicle. In the present embodiment, the collision prediction apparatus 10 is configured by an ECU (Electronic Control Unit) including a microcomputer and a memory.

The collision prediction apparatus 10 is electrically connected to various devices installed in the vehicle and exchanges data with the various devices. Specifically, as shown in FIG. 1, the collision prediction apparatus 10 is electrically connected to a millimeter-wave radar 21, an imaging device 22, a yaw rate sensor 23, a steering angle sensor 24, a vehicle speed sensor 25, a brake ECU 201, and an alarm ECU 202 and exchanges data with them.

The millimeter-wave radar 21 detects presence or absence of an object in the traveling direction of the own vehicle (in front, when the vehicle is travelling forward), a distance between the object and the own vehicle, a position of the object, the size of the object, the shape of the object, and a relative speed of the object with respect to the own vehicle. It is noted that an object detected by the millimeter-wave radar 21 is, more specifically, a set of a plurality of detection points (targets). When the ignition is turned on in the own vehicle, the millimeter-wave radar 21 successively transmits millimeter waves, receives reflected waves of the millimeter waves, and detects objects (targets). The imaging device 22 is configured by a camera including a condensing lens and a light receiving element, and obtains images of scenes in the traveling direction of the own vehicle. When the ignition is turned on in the own vehicle, the imaging device 22 successively obtains images (frame images). For example, the imaging device 22 obtains images at 30 frames per second. It is noted that the frame rate of imaging is not limited to 30 frames per second, but may be selected arbitrarily. The yaw rate sensor 23 detects a yaw rate (turning angle velocity) of the own vehicle. When the ignition is turned on in the own vehicle, the yaw rate sensor 23 successively detects a yaw rate. The steering angle sensor 24 detects a steering wheel angle of the own vehicle. When the ignition is turned on in the own vehicle, the steering angle sensor 24 successively detects a steering angle. The vehicle speed sensor 25 detects a speed of the own vehicle. When the ignition is turned on in the own vehicle, the vehicle speed sensor 25 successively detects a speed of the own vehicle.

The brake ECU 201 is an ECU for brake control and is electrically connected to the collision prediction apparatus 10 and a braking mechanism 211. The brake ECU 201 determines a timing for braking and the amount of braking and controls the braking mechanism 211. The braking mechanism 211 includes a sensor, a motor, a valve, a pump, and various actuators, which concern the brake control. The alarm ECU 202 is an ECU for alarm output and is electrically connected to the collision prediction apparatus 10 and an alarm mechanism 212.

The alarm ECU 202 determines a timing for outputting an alarm, and contents to be output, and controls the alarm mechanism 212. In the present embodiment, the alarm is output as a sound for calling for attention to a collision with a moving object. Thus, in the present embodiment, the alarm mechanism 212 includes devices concerning sound output, such as a loudspeaker and an amplifier. As a result of a collision prediction process described later, when it is predicted that a collision will occur between the own vehicle and a moving object, the brake ECU 201 and the alarm ECU 202 respectively control the braking mechanism 211 and the alarm mechanism 212 to perform a response operation for avoiding the collision. Specifically, automatic brake is applied, or an alarm is issued.

The collision prediction apparatus 10 includes a vehicle path estimation section 11, a moving object path estimation section 12, an obstruction specifying section 13, a moving object extraction area setting section 14, a direction change information acquisition section 15, and a collision prediction section 16. These functional parts 11 to 16 are implemented by a microcomputer of the collision prediction apparatus 10 executing a control program stored in the collision prediction apparatus 10.

The vehicle path estimation section 11 estimates a path of the own vehicle based on values periodically obtained from the yaw rate sensor 23, the steering angle sensor 24, and the vehicle speed sensor 25 in time series. Specifically, the vehicle path estimation section 11 stores periodically obtained yaw rates, steering angles, and vehicle speeds as a history, and estimates, as a path of the own vehicle, positions where the own vehicle will pass through and time when the own vehicle will pass through the positions, based on the history during a predetermined time period.

The moving object path estimation section 12 estimates a path of a moving object based on values periodically obtained from the millimeter-wave radar 21 in time series and values (frame image data) periodically obtained from the imaging device 22 in time series. Specifically, the moving object path estimation section 12 combines positions and distances of respective targets obtained from the millimeter-wave radar 21 with image data obtained from the imaging device 22 to estimate the type, position, size, moving direction, and moving speed of the moving object. Then, the moving object path estimation section 12 estimates, as a path of the own vehicle, positions where the own vehicle will pass through and time when the own vehicle will pass through the positions. It is noted that the type of the moving object may be estimated by pattern matching based on the shape thereof in a frame image.

The obstruction specifying section 13 specifies the position and size of an obstruction located in the traveling direction of the own vehicle. In the present embodiment, an obstruction is an object that is likely to prevent a moving object from being detected by the millimeter-wave radar 21 and the imaging device 22, and is an object that does not move, for example, a stopped or parked vehicle, a telephone pole, and a sign. The meaning of the object that does not move may include an object that is stopped or moves (moves forward or backward) at low speed. For example, a vehicle that moves in the same direction as the traveling direction of the own vehicle at less than 20 km per hour is also regarded as an object that does not move, and corresponds to an obstruction. It is noted that only a state where an object is stopped may mean the state where the object does not move. The obstruction specifying section 13 specifies the position and size of the obstruction based on values (frame image data) periodically obtained from the imaging device 22 in time series.

The moving object extraction area setting section 14 sets a moving object extraction area with reference to the position and size of the obstruction by using the position and size of the obstruction specified by the obstruction specifying section 13 and direction change information described later acquired by the direction change information acquisition section 15. When a moving object is recognized (extracted) in the moving object extraction area, a path of the moving object used when a collision with the own vehicle is predicted is used under predetermined conditions, the path being estimated based on values of the millimeter-wave radar 21 and the imaging device 22 obtained during a time period shorter than that when the moving object is recognized in an area different from the moving object extraction area. The moving object extraction area will be described in detail.

The direction change information acquisition section 15 acquires direction change information indicating a change of the traveling direction of the own vehicle. In the present embodiment, the direction change information indicates a change of the steering wheel angle obtained from the steering angle sensor 24. When the steering wheel angle changes, the traveling direction of the own vehicle changes.

The collision prediction section 16 determines presence or absence of occurrence of a collision (determines whether a collision will occur) between the own vehicle and a moving object by using a path of the own vehicle estimated by the vehicle path estimation section 11, a path of the moving object estimated by the moving object path estimation section 12, and direction change information acquired by the direction change information acquisition section 15, that is, a steering angle.

The collision prediction apparatus 10 having the above configuration performs a collision prediction process described later, so that collision prediction can be performed with high accuracy even when the traveling direction of the own vehicle changes.

The millimeter-wave radar 21 and the imaging device 22 described above correspond to a first sensor. The steering angle sensor 24 corresponds to a second sensor. The imaging device 22 corresponds to an imaging section.

A2. Collision Prediction Process

Figure 2:
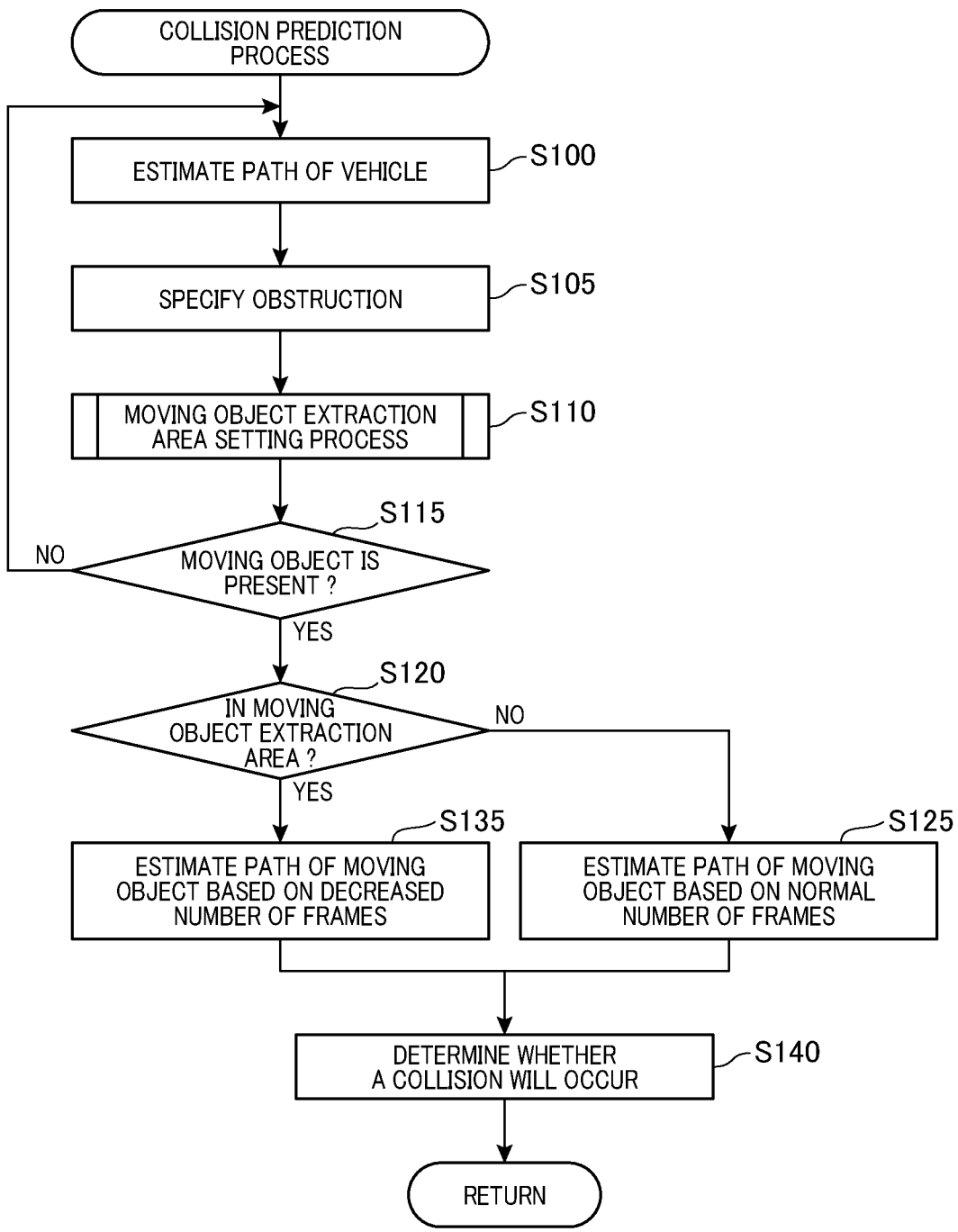
FIG. 2 is a flowchart illustrating a procedure of a collision prediction process.

A collision prediction process shown in FIG. 2 is performed by the collision prediction apparatus 10 when the ignition is turned on in the own vehicle. The vehicle path estimation section 11 estimates a path of the own vehicle (step S100).

Figure 3:
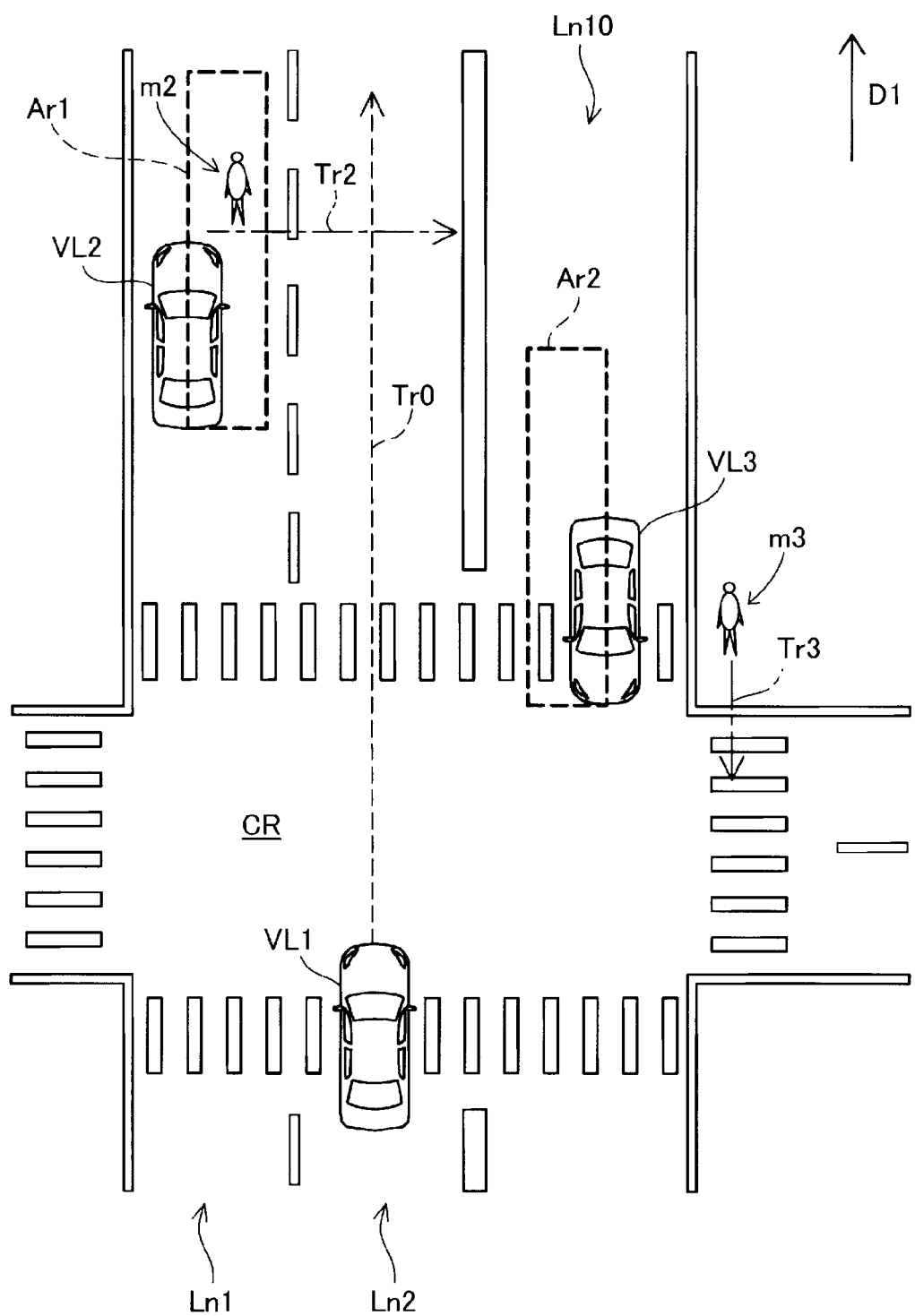
FIG. 3 is a diagram illustrating an example of the collision prediction process.

In the example in FIG. 3, a vehicle VL1, which is the own vehicle, traveled straight ahead in a second lane Ln2 of a two-lane road and has just entered an intersection CR. In such a situation, a path traveling straight ahead in the second lane Ln2 is estimated as a path Tr0 of the vehicle VL1 based on values periodically obtained from the millimeter-wave radar 21 in time series and values (frame image data) periodically obtained from the imaging device 22 in time series.

The obstruction specifying section 13 specifies the position and size of an obstruction located in the traveling direction of the own vehicle (step S105).

As in the example in FIG. 3, when a stopped vehicle VL2 is present in front of and in the traveling direction D1 of the vehicle VL1 and in the adjacent first lane Ln1, the obstruction specifying section 13 specifies the vehicle VL2 as an obstruction, and specifies the position and size thereof. In addition, as shown in FIG. 3, when a vehicle VL3 is present in front of and in the traveling direction D1 of the vehicle VL1 and in the opposite lane Ln10, the obstruction specifying section 13 specifies the vehicle VL3 as an obstruction, and specifies the position and size thereof. It is noted that, in the example in FIG. 3, a person m2 is walking (crossing) in the first lane Ln1 and in the vicinity of the vehicle VL2, and a person m3 is walking on a sidewalk and in the vicinity of the vehicle VL3.

Figure 4:
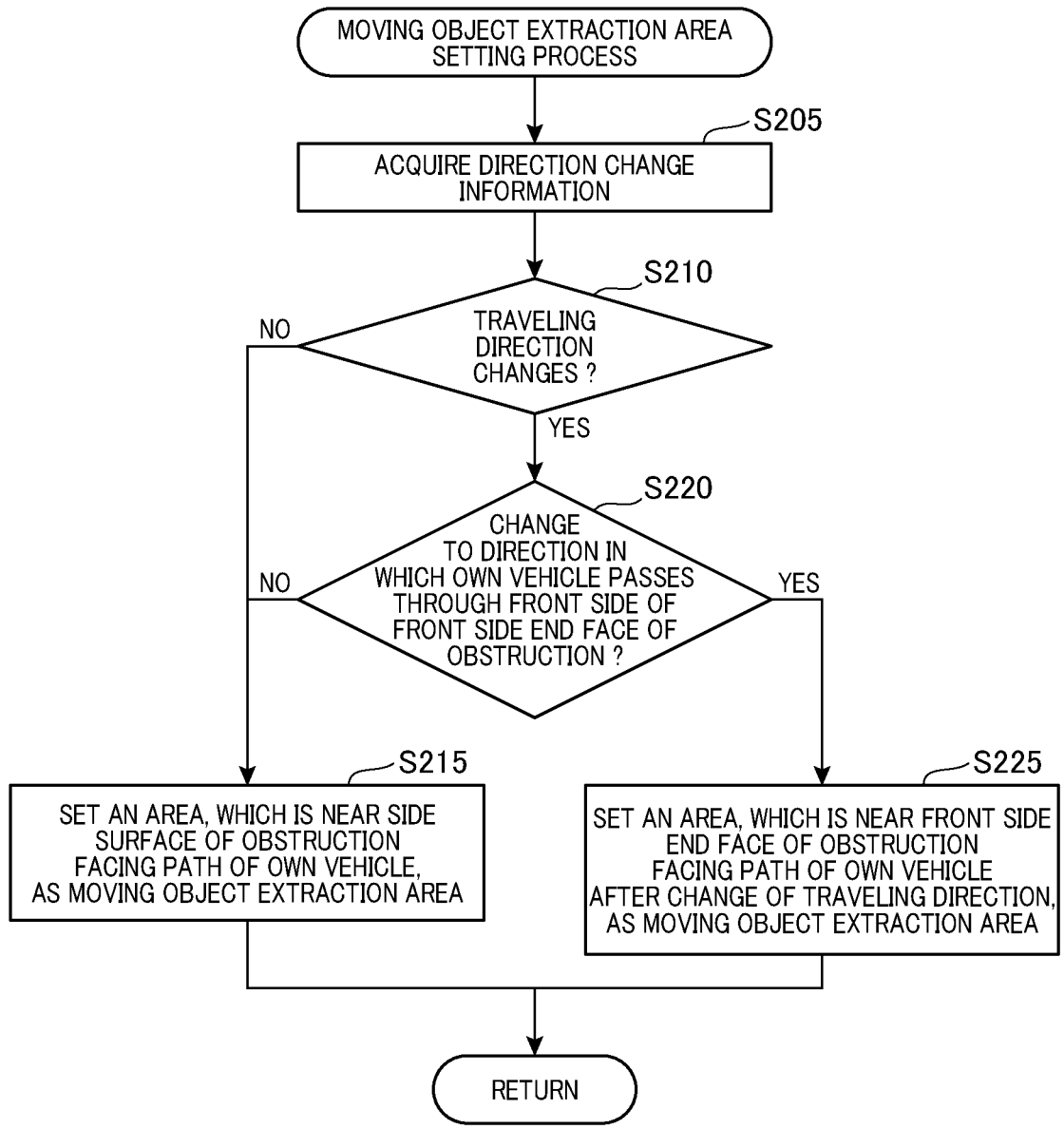
FIG. 4 is a flowchart illustrating a procedure of a moving object extraction area setting process.

After step S105, the moving object extraction area setting section 14 and the direction change information acquisition section 15 perform a moving object extraction area setting process (step S110). As shown in FIG. 4, in the moving object extraction area setting process, first, the direction change information acquisition section 15 acquires direction change information (step 205). The direction change information acquisition section 15 determines whether the traveling direction of the own vehicle changes, based on the direction change information acquired in step 205 (step S210).

If it is determined that the traveling direction of the own vehicle does not change (step S210: NO), the moving object extraction area setting section 14 sets an area, which is near a side surface of the obstruction facing the path of the own vehicle, as a moving object extraction area (step S215). In the example in FIG. 3, when information indicating that the steering wheel angle does not change is obtained in step S205, a moving object extraction area Ar1 is set for the vehicle VL2, which is an obstruction, and a moving object extraction area Ar2 is set for the vehicle VL3, which is an obstruction.

Figure 5:
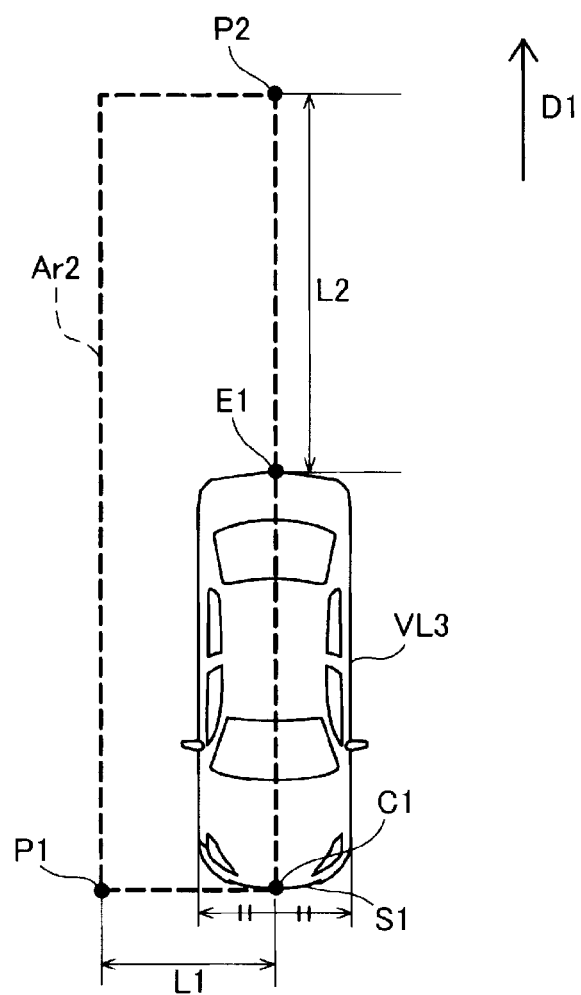
FIG. 5 is a diagram illustrating an example of setting a moving object extraction area.

The moving object extraction area set in step S215, that is, the moving object extraction area set when the traveling direction does not change will be described in detail with reference to FIG. 5. In FIG. 5, the moving object extraction area Ar2 is illustrated in detail. As shown in FIG. 5, the moving object extraction area Ar2 is set as an area having, in plan view, a rectangular shape that has a side extending from the center C1, which is located in the direction orthogonal to the traveling direction D1, of a front side end face S1 of the vehicle VL3, which is an obstruction, to a first point P1 away from the center C1 by a predetermined first distance L1 so as to approach the path Tr0 of the vehicle VL1 in the direction orthogonal to the traveling direction D1.

The rectangular shape has a side extending from the center C1 to a second point P2 away from a rear end E1 of the vehicle VL3, which is an obstruction, in the traveling direction D1 by a second distance L2. The moving object extraction area Ar1 shown in FIG. 3 is also set in a similar manner. The first distance L1 may be, for example, 1.5 m. The second distance L2 may be, for example, 5.0 m. The first distance L1 and second distance L2 are not limited to these values but may be arbitrary values. It is noted that the rear end E1 is defined with reference to a target that is the rearmost in the traveling direction D1 among targets of the vehicle VL3 obtained by the millimeter-wave radar 21. That is, as the rear end E1, a practical rear end (the rearmost point in the traveling direction D1) of the vehicle VL3 may not be set.

As shown in FIG. 4, in step S210 described above, if it is determined that the traveling direction of the own vehicle changes (step S210: YES), the direction change information acquisition section 15 determines whether the change of the traveling direction indicated by the direction change information obtained in step S205 is a change to the direction in which the own vehicle passes through the front side of the front side end face of the obstruction (step S220). The direction change information acquisition section 15 may make a determination in step S220 by using the position and size of the obstruction specified in step S105, the position of the own vehicle (for example, the current position of the own vehicle specified when the path of the own vehicle is specified in step S100), and a steering wheel angle obtained from the steering angle sensor 24.

If it is determined that the change of the traveling direction is not a change to the direction in which the own vehicle passes through the front side of the front side end face of the obstruction (step S220: NO), step S215 described above is performed. In contrast, if it is determined that the change of the traveling direction is a change to the direction in which the own vehicle passes through the front side of the front side end face of the obstruction (step S220: YES), the moving object extraction area setting section 14 sets an area, which is near the front side end face of the obstruction facing the path of the own vehicle after the change, as a moving object extraction area (step S225).

Figure 6:
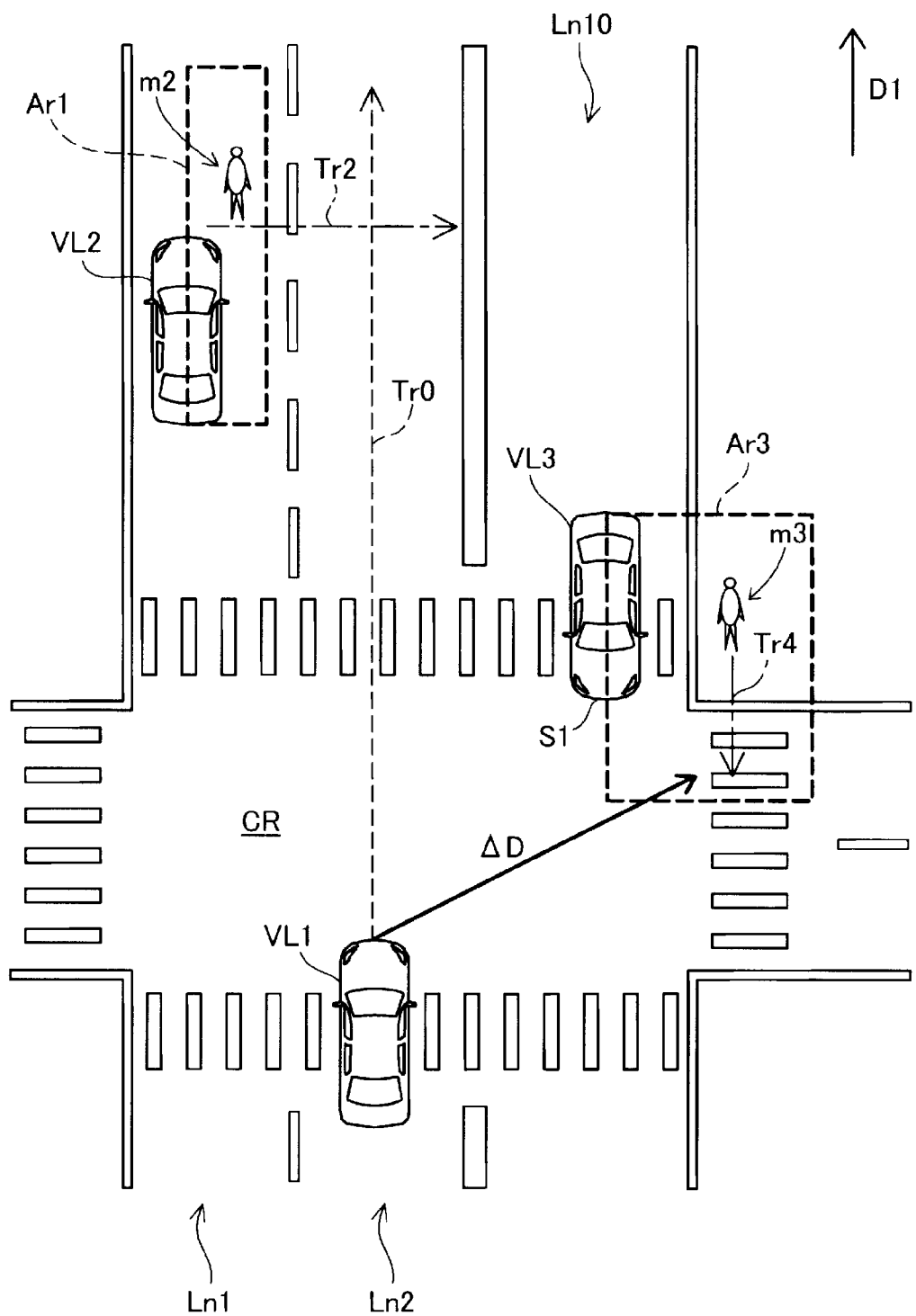
FIG. 6 is a diagram illustrating an example of the collision prediction process.

In the example in FIG. 6, a positional relationship among the vehicles VL1 to VL3 and a positional relationship between persons m2 and m3 described later are the same as those in the example in FIG. 3. It is noted that the example in FIG. 6 differs from the example in FIG. 3 in that the vehicle VL1 just starts steering to the right to turn right, though the vehicle VL1 has been running straight in the second lane Ln2. In the example in FIG. 3, a change ΔD of the traveling direction is obtained in step S205. The change ΔD is determined as a change to the direction in which the own vehicle passes through the front side of the front side end face S1 of the vehicle VL3, as shown in FIG. 3. In this case, step S225 is performed in which a moving object extraction area Ar3 is set in the vicinity of the vehicle VL3, as shown in FIG. 6. The moving object extraction area Ar3 differs from the moving object extraction area Ar1 shown in FIG. 3.

Figure 7:
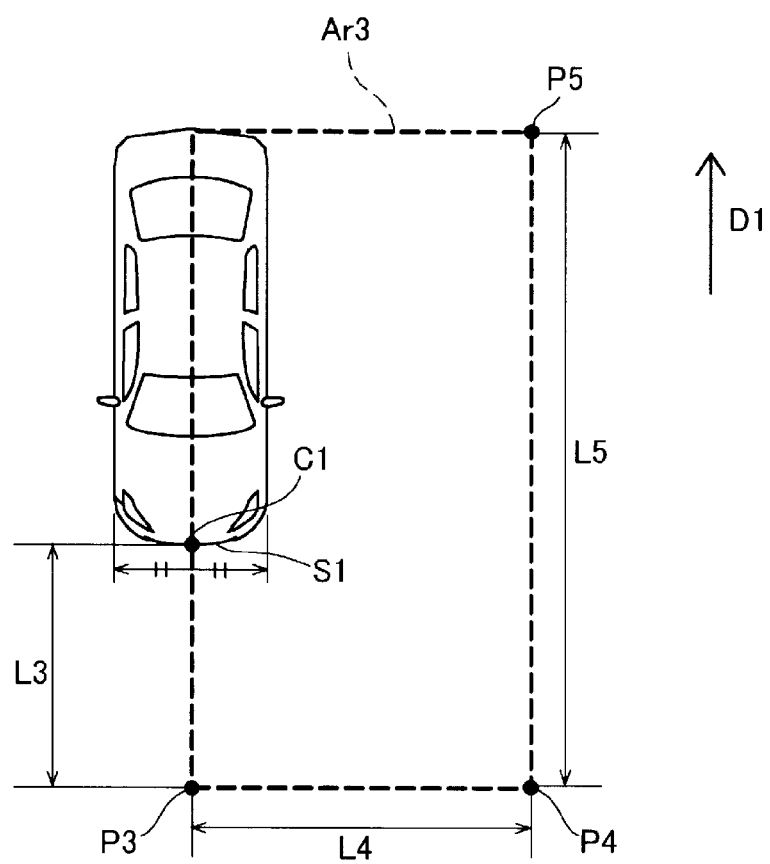
FIG. 7 is a diagram illustrating an example of setting a moving object extraction area.

The moving object extraction area set in step S225, that is, the moving object extraction area set when the traveling direction changes to the direction in which the own vehicle passes through the front side of the front side end face of the obstruction will be described in detail with reference to FIG. 7. In FIG. 7, the moving object extraction area Ar3 is illustrated in detail. As shown in FIG. 7, the moving object extraction area Ar3 is set as an area having, in plan view, a rectangular shape that has a side extending from a third point P3 to a fourth point P4. The third point P3 is away from the center C1, which is located in the direction orthogonal to the traveling direction D1, of a front side end face S1 to the front side by a predetermined third distance L3 in the direction opposite to the traveling direction D1. The fourth point P4 is away from the third point P3 by a predetermined fourth distance L4 so as to be away from the path Tr0 of the own vehicle in the direction orthogonal to the traveling direction D1. The rectangular shape has a side extending from a fifth point P5 to the fourth point P4. The fifth point P5 is away from the fourth point P4 by a predetermined fifth distance L5 in the traveling direction D1. The third distance L3 may be, for example, 4.0 m. The fourth distance L4 may be, for example, 5.0 m. The fifth distance L5 may be, for example, 9.0 m. The third distance L3, the fourth distance L4, and the fifth distance L5 are not limited to these values but may be arbitrary values.

As shown in FIG. 2 and FIG. 4, after step S215 or step S225, the moving object path estimation section 12 determines whether a moving object is present in the traveling direction (forward along the traveling direction D1) (step S115). If it is determined that no moving object is present in the traveling direction (step S115: NO), the present process returns to step S100 described above.

If it is determined that a moving object is present in the traveling direction (step S110: YES), the moving object path estimation section 12 determines whether the moving object is present in the moving object extraction area (step S120). In step S115, if it is determined that a plurality of moving objects are present, processing in step S120 and succeeding steps is performed for each of the moving objects.

If it is determined that no moving object is present in the moving object extraction area (step S120: NO), the moving object path estimation section 12 estimates a path of the moving object based on image data having the normal (standard) number of frames (normal (standard) frame number) and measurement results of the millimeter-wave radar 21 obtained during a time period corresponding to the time period during which the image data having the normal number of frames is obtained (step S125). In the present embodiment, the normal number of frames is five, and is not limited to five but may be selected arbitrarily.

In contrast, if it is determined that a moving object is present in the moving object extraction area (step S120: YES), the moving object path estimation section 12 estimates a path of the moving object based on image data having the decreased number of frames (decreased frame number) and measurement results of the millimeter-wave radar 21 obtained during a time period corresponding to the time period during which the image data having the decreased number of frames is obtained (step S135). The decreased number of frames is the number of frames less than the normal number of frames in step S125 described above, and is three in the present embodiment. It is noted that the decreased number of frames is not limited to three but may be the arbitrary number of frames less than the normal number of frames. In step S135 different from S125 described above, a path of the moving object is estimated based on image data having the decreased number of frames and measurement results of the millimeter-wave radar 21 obtained during a time period corresponding to the time period during which the image data having the decreased number of frames is obtained (step S135). Hence, compared with step S125, the time required for estimating a path of the moving object is shorter.

After step S125 or step S135 described above, the collision prediction section 16 determines presence or absence of occurrence of a collision (determines whether a collision will occur) between the own vehicle and the moving object based on the path of the own vehicle estimated in step S100 and the path of the moving object estimated in step S125 or step S135 (step S140).

The processing from step S115 to step S140 described above will be specifically described with reference to the examples in FIG. 3 and FIG. 6.

In the example in FIG. 3, the moving object path estimation section 12 recognizes the person m2, which is a moving object, in the moving object extraction area Ar1, and recognizes the person m3, which is a moving object, on the sidewalk along the opposite lane Ln10. Hence, in step S115, it is determined that a plurality of moving objects (two persons m2 and m3) are present in the traveling direction D1. Since the person m2 is present inside the moving object extraction area Ar1, step S135 is performed in which a path Tr2 of the person m2 is estimated by using a frame image having three frames. The path Tr0 of the vehicle VL1 and the path Tr2 of the person m2 cross each other. When the vehicle VL1 and the path Tr2 reach the crossing at the same time, presence of occurrence of a collision is determined (it is determined that a collision will occur) in step S140. In contrast, since the person m3 is not present inside the moving object extraction area Art, step S125 is performed in which a path Tr3 of the person m3 is estimated by using a frame image having five frames. The path Tr0 of the vehicle VL1 and the path Tr3 of the person m3 do not cross each other. Hence, absence of occurrence of a collision is determined (it is determined that a collision will not occur) in step S140.

In the example in FIG. 6, the processing concerning the estimation of the path of the person m2 is the same as that of the example in FIG. 3. In contrast, the processing concerning the estimation of the path of the person m3 differs from that of the example in FIG. 3. Specifically, in the example in FIG. 6, since the person m3 is present inside the moving object extraction area Ar3, step S135 is performed as in the case of person m2, so that a path Tr4 of the person m3 is estimated by using a frame image having three frames. It is noted that the path Tr4 of the person m3 estimated in the example in FIG. 6 is similar to the path Tr3 estimated in the example in FIG. 3. Hence, also in the example in FIG. 6, absence of occurrence of a collision is determined (it is determined that a collision will not occur) in step S140.

After step S140 described above, the present process returns to step S100 described above. In the present embodiment, if presence of occurrence of a collision is determined (if it is determined that a collision will occur) in step S140, the collision prediction apparatus 10 notifies the brake ECU 201 and the alarm ECU 202 of information indicating presence of occurrence of a collision (information indicating that a collision will occur) and information on the location of the collision. Based on the information, the response operation for avoiding the collision described above is performed.

According to the collision prediction apparatus 10 of the first embodiment described above, in the area in the vicinity of an obstruction (vehicle VL3), an area, which is near an outer periphery (front side end face S1) of the obstruction facing the path of the own vehicle after the change ΔD of the traveling direction D1 indicated by the direction change information, is set as the moving object extraction area Ar3. Hence, even when the change of the traveling direction is changed, collision determination can be performed with high accuracy.

When the traveling direction D1 indicated by the direction change information is not changed, the moving object extraction area Art is set as an area having, in plan view, a rectangular shape that has a side extending from the center C1, which is located in the direction orthogonal to the traveling direction D1, of the front side end face S1 of an obstruction (vehicle VL3) to the first point P1 away from the center C1 by the predetermined first distance L1 so as to approach the path Tr0 of the vehicle VL1 in the direction orthogonal to the traveling direction D1. The rectangular shape has a side extending from the center C1 to a second point P2 away from the rear end E1 of the obstruction in the traveling direction D1 by the second distance L2. Hence, an area can be set with high accuracy where when the traveling direction of the vehicle is not changed, when the moving object (person m3) moves to the path (paths Tr2 and Tr3) of the obstruction (vehicle VL3), relatively less time remains before the response operation for avoiding a collision is performed. Hence, the accuracy of the collision prediction can be prevented from lowering inappropriately.

When the change of the traveling direction D1 indicated by the direction change information is the change ΔD from the traveling direction D1 to the direction in which the own vehicle passes through the front side of the front side end face S1 of the obstruction (vehicle VL3), the moving object extraction area Ar3 is set as an area having, in plan view, a rectangular shape that has a side extending from the third point P3 to the fourth point P4. The third point P3 is away from the center C1, which is located in the direction orthogonal to the traveling direction D1, of the front side end face S1 to the front side by the predetermined third distance L3 in the direction opposite to the traveling direction D1. The fourth point P4 is away from the third point P3 by the predetermined fourth distance L4 so as to be away from the path Tr0 of the own vehicle in the orthogonal direction. The rectangular shape has a side extending from the fifth point P5 to the fourth point P4. The fifth point P5 is away from the fourth point P4 by the predetermined fifth distance L5 in the traveling direction D1. Hence, an area can be set with high accuracy where when the moving object (person m3) moves to the path of the vehicle VL1 after the traveling direction is changed, relatively less time remains before the response operation for avoiding a collision is performed.

In addition, when moving objects (person m2 and person m3) are recognized in the moving object extraction areas (moving object extraction area Ar1 and moving object extraction area Ar3), presence or absence of occurrence of a collision is determined (it is determined whether a collision will occur) by using the path of the moving object estimated based on the information acquired from the first sensor (millimeter-wave radar 21 and imaging device 22) during a time period shorter than that when the moving object is recognized in an area different from the moving object extraction area. Hence, even in a situation in which relatively less time remains before the response operation is performed for avoiding a collision caused when the moving objects (person m2 and person m3) appear from behind the obstructions (vehicle V2 and vehicle VL3) and move to the path Tr0 of the vehicle or the path of the vehicle after the change of the traveling direction D1, prediction of a collision can be completed in a short time.

In addition, since the direction change information acquisition section 15 acquires the direction change information based on values obtained from the steering angle sensor 24, that is, a steering wheel angle of the own vehicle, the change of the traveling direction D1 of the vehicle VL1 can be specified with high accuracy.

B. Second Embodiment

In the first embodiment, the decreased number of frames in step S135 is fixed to three. However, in the second embodiment, the decreased number of frames in step S135 is determined depending on a distance between an obstruction and a path of the own vehicle after the change of the traveling direction. The configuration of the collision prediction apparatus 10 and other procedures of the collision prediction process of the second embodiment are the same as those of the first embodiment.

Figure 8:
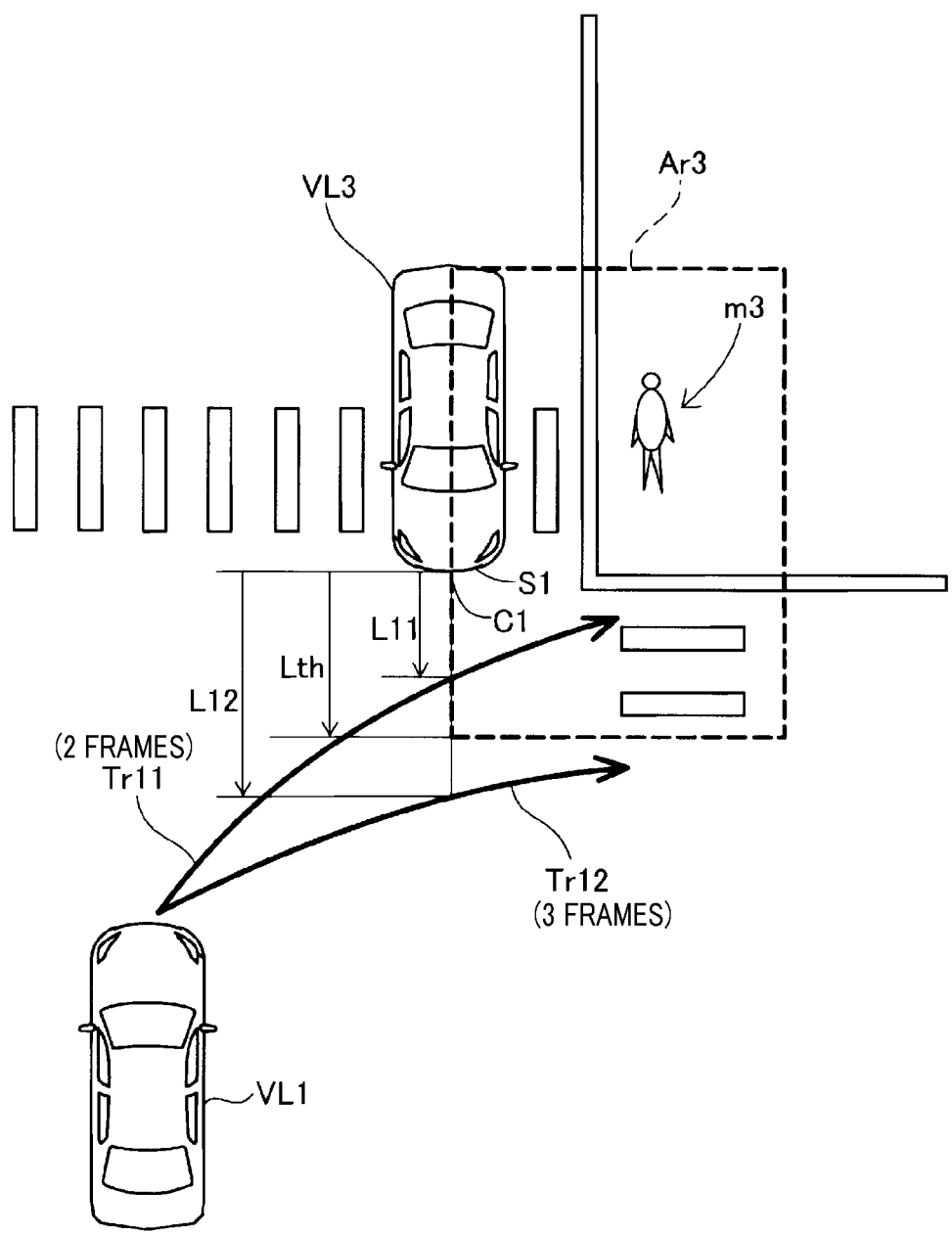
FIG. 8 is a diagram illustrating an example of a path of an own vehicle when the traveling direction is changed.

In the example in FIG. 8, the decreased number of frames in step S135 differs between a case where a path Tr11 is the path of the own vehicle VL1 after the change of the traveling direction and a case where a path Tr12 is the path of the own vehicle VL1 after the change of the traveling direction. Specifically, in the case of the path Tr11, the decreased number of frames is two, and in the case of the path Tr12, the decreased number of frames is three. Such a difference is due to a deference between the distances between the paths Tr11 and Tr12 and the front side end face S1 of the vehicle VL3. A distance L11 between the path Tr11 and the front side end face S1 is less than a predetermined threshold distance Lth. In this case, the decreased number of frames is set to two. In contrast, a distance L12 between the path Tr12 and the front side end face S1 is more than the threshold distance Lth. In this case, the decreased number of frames is set to three. In the present embodiment, the distance between the path and the vehicle VL3 is a distance between each of the paths and the center C1 of the front side end face S1 in the direction orthogonal to the traveling direction D1. The distance between the path and the vehicle VL3 may be a distance between each of the paths and an edge portion of the front side end face S1 closest to the original path Tr0 of the vehicle VL1.

As the path of the own vehicle VL1 after the change of the traveling direction is closer to the vehicle VL3, which is an obstruction, a probability that the own vehicle VL1 would collide with the person m3 increases. Hence, in the present embodiment, as the path of the own vehicle VL1 after the change of the traveling direction is closer to the vehicle VL3, the number of frame images used for estimating a path of the person m3 is set to be smaller. Thus, the time required for collision prediction can be shorter as the path of the own vehicle VL1 is closer to the vehicle VL3, which is an obstruction, whereby the response operation for collision avoidance performed later can be prevented from being delayed.

The above-described collision prediction apparatus of the second embodiment provides effects similar to those of the collision prediction apparatus 10 of the first embodiment. In addition, as the path of the own vehicle VL1 after the change of the traveling direction is closer to an obstruction (person m2), presence or absence of occurrence of a collision is determined (it is determined whether a collision will occur) during a shorter time period by using a path of a moving object estimated based on the information obtained from the first sensor (millimeter-wave radar 21 and imaging device 22). Hence, even in a situation in which less time is remains before the response operation is performed for collision avoidance, prediction of a collision can be completed in a shorter time, so that a probability of the collision avoidance can be improved.

Figure 9:
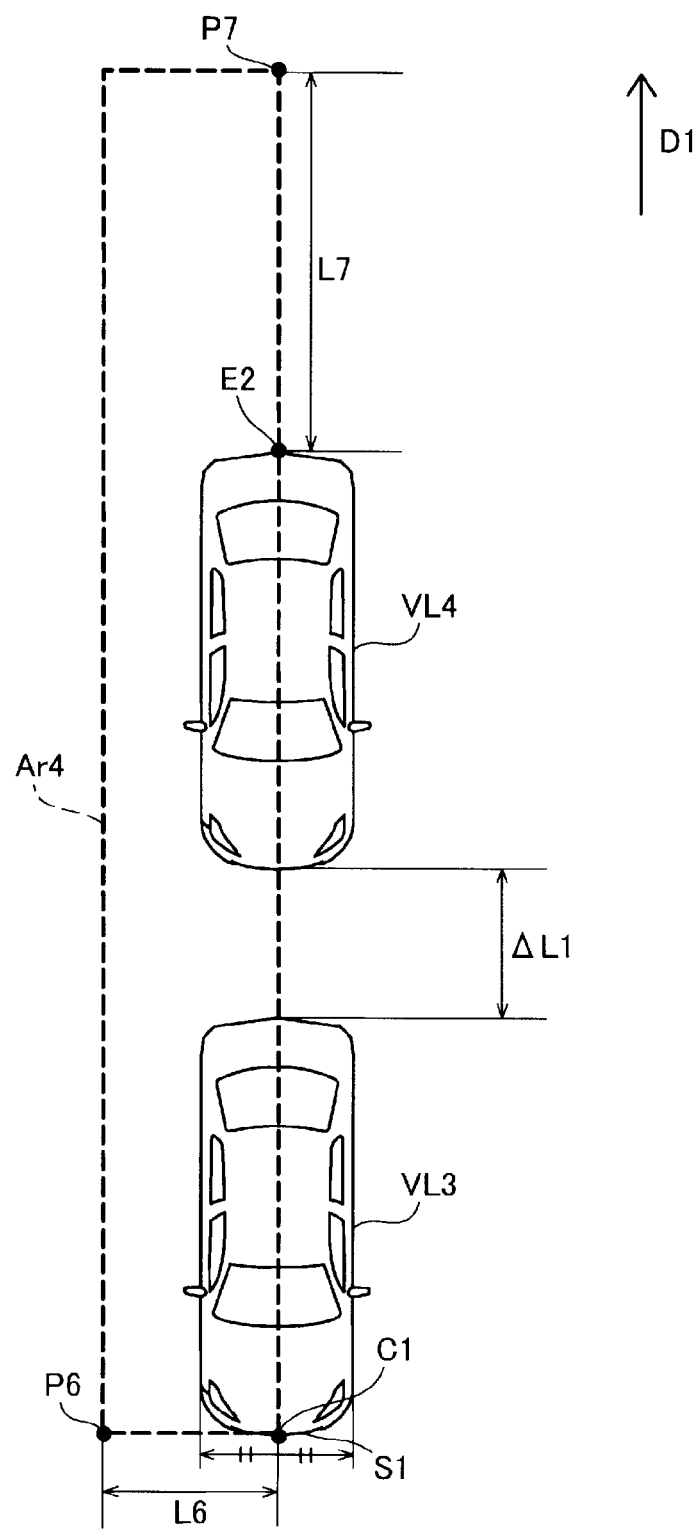
FIG. 9 is a diagram illustrating an example of setting a moving object extraction area.

C. Other Embodiments (C-1) In the first embodiment, the moving object extraction areas (moving object extraction area Ar1 and moving object extraction area Art) in a case where the traveling direction is not changed are set with reference to the position and size of a vehicle (vehicle VL2 or vehicle VL3), which is an obstruction. However, the present disclosure is not limited to this. The moving object extraction areas may be set with reference to the positions and sizes of a plurality of obstructions. Specifically, for example, as shown in FIG. 9, when a vehicle VL4 is recognized together with the vehicle VL3 described above as obstructions, the vehicle VL4 being stopped in a state where the vehicle VL4 and the vehicle VL3 are side-by-side and the vehicle VL4 is away from the vehicle VL3 in the traveling direction by a distance $\Delta$L1, a moving object extraction area Ar4 may be set as below. That is, the moving object extraction area Ar4 may be set as an area having, in plan view, a rectangular shape that has a side extending from the center C1, which is located in the direction orthogonal to the traveling direction D1, of the front side end face S1 of the nearest obstruction (vehicle VL3) among the plurality of obstructions (two vehicles VL3 and VL4) to a point P6 away from the center C1 by a sixth distance L6 so as to approach the path Tr0 of the vehicle VL1 in the direction orthogonal to the traveling direction D1. The rectangular shape has a side extending from the center C1 to a seventh point P7 away from a rear end E2 of the obstruction (vehicle VL4), which is the farthest obstruction among the plurality of obstructions (two vehicles VL3 and VL4), in the traveling direction D1 by a predetermined seventh distance L7. The sixth distance L6 may be, for example, 1.5 m as in the first distance L1 described above. The seventh distance L7 may be, for example, 5.0 m as in the second distance L2 described above. The sixth distance L6 and the seventh distance L7 are not limited to these values but may be arbitrary values.

Figure 10:
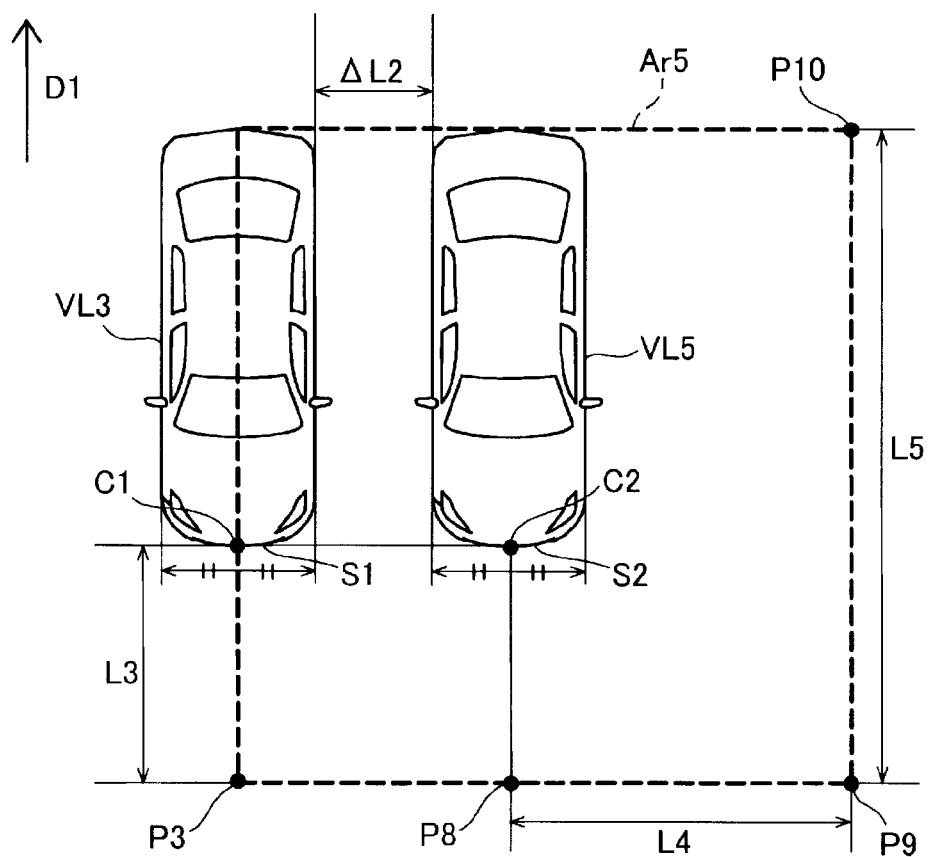
FIG. 10 is a diagram illustrating an example of setting a moving object extraction area.

Similarly, the moving object extraction area set when the traveling direction changes to the direction in which the own vehicle passes through the front side of the front side end face of the obstruction also may be set with reference to the positions and sizes of the plurality of obstructions. Specifically, for example, as shown in FIG. 10, when a vehicle VL5 is recognized together with the vehicle VL3 described above as obstructions, the vehicle VL5 being stopped in a state where the vehicle VL5 and the vehicle VL3 are side-by-side and the vehicle VL5 is away from the path Tr0 in the direction orthogonal to the traveling direction D1, a moving object extraction area Ar5 may be set as below. That is, the moving object extraction area Ar5 may be set as an area having, in plan view, a rectangular shape that has apexes that are a third point P3, a ninth point P9, and a tenth point P10. The third point P3 is near to the own vehicle by the third distance L3 described above from the center C1, which is located in the direction orthogonal to the traveling direction D1, of the front side end face S1 of the obstruction (vehicle VL3) nearest to the path Tr0 among a plurality of obstructions (two vehicles VL3 and VL5). The ninth point P9 is away from an eighth point P8 by the fourth distance L4 described above so as to be away from the path Tr0 in the direction orthogonal to the traveling direction D1. The eighth point P8 is near to the own vehicle by the third distance L3 from the center C2, which is located in the direction orthogonal to the traveling direction D1, of a front side end face S2 of the obstruction (vehicle VL5) furthest from the path Tr0 among the plurality of obstructions (two vehicles VL3 and VL5). The tenth point P10 is away from the ninth point P9 by the fifth distance L5 described above in the traveling direction D1.

(C-2) In the first and second embodiments, the moving object extraction area is used to determine whether the number of frame images used when a path of a moving object is estimated is set to the normal number of frames or the decreased number of frames. When a moving object is recognized in the moving object extraction area, the number of frame images used when the path of the moving object is estimated is set to the decreased number of frames. When a moving object is recognized in an area different from the moving object extraction area, the number of frame images used when the path of the moving object is estimated is set to the normal number of frames. However, the present disclosure is not limited to this. The moving object extraction area may be used to determine whether a path of an object is estimated and a collision is predicted. For example, when a moving object is recognized in the moving object extraction area, the path of the object is estimated and a collision is predicted. When a moving object is recognized in an area different from the moving object extraction area, the path of the object is not estimated and a collision is not predicted.

(C-3) If it is determined that the traveling direction of the own vehicle does not change, and one obstruction is present, the position and shape of the moving object extraction area are not limited to those of the moving object extraction area Ar1 and Art in the first and second embodiments described above. For example, the moving object extraction area may be an area having a rectangular shape that has an apex, which is an edge point nearest to the path Tr0 of the own vehicle (vehicle VL1) on the front side end face (end face S1) of the obstruction, and a side parallel to the traveling direction D1. The moving object extraction area may be an area having a rectangular shape that has an apex, which is a point that is on the front side end face of the obstruction and is away by a predetermined distance from a edge point nearest to the path Tr0 of the own vehicle (vehicle VL1) in the direction orthogonal to the traveling direction D1, and a side parallel to the traveling direction D1. For example, the moving object extraction area may be an area having a circular shape having a predetermined radius centering on an intersection between an imaginary line passing through the center of the front side end face of the obstruction along the direction orthogonal to the traveling direction D1, and parallel to the traveling direction D1, and an imaginary line orthogonal to the traveling direction D1 and passing through the center of a side surface of the obstruction, which is near the path Tr0 of the own vehicle (vehicle VL1), along the traveling direction D1. The moving object extraction areas of these examples can be set using the position and size of the obstruction. That is, typically, an area that is set using the position and size of the obstruction and is with reference to the position and size of the obstruction may be set as the moving object extraction area.

(C-4) In the first and second embodiments, the direction change information indicates a change of the steering wheel angle obtained from the steering angle sensor 24. However, the present disclosure is not limited to this. For example, the direction change information may indicate for example, a change of the steering angle of a tire obtained from a tire steering angle sensor, not shown, installed in the own vehicle. For example, the direction change information may indicate, a change of a yaw rate obtained from the yaw rate sensor 23. For example, the direction change information may indicate an operating state of a direction indicator (blinker) installed in the own vehicle. When the operating state of the direction indicator indicates a right turn, the direction change information indicates that the traveling direction of the own vehicle change to the right. Conversely, when the operating state of the direction indicator indicates a left turn, the direction change information indicates that the traveling direction of the own vehicle changes to the left. In addition, in a case where the vehicle includes map information for a navigation system, not shown, the direction change information may be obtained by specifying the type of a road on which the own vehicle runs based on the map information. Specifically, for example, when the type of the road on which the own vehicle runs based on the map information is a left-turn-only lane, the direction change information indicates that the traveling direction of the own vehicle changes to the left. For example, the direction change information may indicate the type of a sign painted on a road in an image obtained by the imaging device 22. Specifically, for example, when a sign painted on a road in an image indicates a left turn, it indicates that the traveling direction of the own vehicle changes to the left.

(C-5) In the first and second embodiments, the vehicle path estimation section 11 estimates a path of the own vehicle based on values periodically obtained from the yaw rate sensor 23, the steering angle sensor 24, and the vehicle speed sensor 25. However, the present disclosure is not limited to this. For example, in a configuration in which a GPS system is installed in the own vehicle, a path of the own vehicle may be estimated based on a history of positional information of the own vehicle obtained by the GPS system in time series.

(C-6) In the first and second embodiments, the moving object path estimation section 12 estimates a path of a moving object based on values periodically obtained from the millimeter-wave radar 21 and values (frame image data) periodically obtained from the imaging device 22. However, the present disclosure is not limited to this. For example, a path of a moving object may be estimated based on only the values periodically obtained from the millimeter-wave radar 21.

According to this configuration, the millimeter-wave radar 21 corresponds to the first sensor. For example, a path of a moving object may be estimated based on only the values (frame image data) periodically obtained from the imaging device 22. According to this configuration, the imaging device 22 corresponds to the first sensor.

(C-7) In the first and second embodiments, the sensors 21 and 23 to 25 and the imaging device 22 periodically obtain values, but may non-periodically obtain values in time series.

(C-8) In the second embodiment, only one threshold distance Lth is set, but a plurality of threshold distances Lth may be set. Hence, since the time required for collision prediction can be shorter more accurately depending on a distance between the path of the own vehicle VL1 and the obstruction (vehicle VL3), a response operation for collision avoidance performed later can be reliably prevented from being delayed.

(C-9) In the embodiments, part of the configuration implemented via hardware may be replaced with software. Conversely, part of the configuration implemented via software may be replaced with hardware. For example, at least one functional part of the vehicle path estimation section 11, the moving object path estimation section 12, the obstruction specifying section 13, the moving object extraction area setting section 14, the direction change information acquisition section 15, and the collision prediction section 16 may be implemented by an integrated circuit, a discrete circuit, or the combination thereof. When some of or all of the functions of the present disclosure are implemented via software, the software (computer program) may be provided by being stored in a computer-readable storage medium. The computer-readable storage medium is not limited to a portable storage medium such as a flexible disk and a CD-ROM, but include various internal memories in the computer such as a RAM and a ROM and external memories fixed to the computer such as a hard disk. That is, the computer-readable storage medium has a broad meaning of a storage medium that can non-transitorily store data packets.

The present disclosure is not limited to the above embodiments, but can be implemented with various configurations within the scope of the spirit of the present disclosure. For example, technical features in the embodiments can be appropriately replaced or combined with each other.

The embodiment of the present disclosure provides collision prediction apparatus that is installed in a vehicle (VL1) and predicts a collision between a moving object (m2, m3) and the vehicle. The apparatus includes: a vehicle path estimation section (11) that estimates a path of the vehicle; a moving object path estimation section (12) that estimates a path of the moving object based on information obtained from a first sensor (21, 22) in time series and used for recognizing the moving object; an obstruction specifying section (13) that specifies a position and size of an obstruction (VL3) present in a traveling direction (D1) of the vehicle with respect to the vehicle; a direction change information acquisition section (15) that acquires direction change information indicating a change of the traveling direction; a moving object extraction area setting section (14) that sets a moving object extraction area (Ar2, Ar3) with reference to the position and size of the obstruction by using the position and size of the specified obstruction and the acquired direction change information; and a collision prediction section (16) that determines presence or absence of occurrence of a collision (determines whether a collision will occur) between the vehicle and the moving object by using the estimated path of the vehicle, the estimated path of the moving object, and the acquired direction change information, when the moving object is recognized in the moving object extraction area based on the information obtained from the first sensor. The moving object extraction area setting section sets, as the moving object extraction area, an area that is in the vicinity of the obstruction and is near an outer periphery of the obstruction facing the path of the vehicle after the change of the traveling direction indicated by the direction change information.

According to the collision prediction apparatus, in the area in the vicinity of an obstruction, an area, which is near an outer periphery of the obstruction facing the path of the vehicle after the change of the traveling direction indicated by the direction change information, is set as the moving object extraction area. Hence, even when the traveling direction is changed, collision determination can be performed with high accuracy.

The present disclosure can be implemented by various manners other than the collision prediction apparatus. The present disclosure can be implemented by manners such as a collision prediction method, a computer program for implementing the method, a storage medium storing the computer program, and a vehicle in which the collision prediction apparatus is installed.

What is claimed is:

1. A collision prediction apparatus that is installed in a vehicle and predicts a collision between a moving object and the vehicle, the apparatus comprising:
a vehicle path estimation section that estimates a path of the vehicle;
a moving object path estimation section that estimates a path of the moving object based on information obtained from a first sensor in time series and used for recognizing the moving object;
an obstruction specifying section that specifies a position and size of an obstruction present in a traveling direction of the vehicle with respect to the vehicle;
a direction change information acquisition section that acquires direction change information indicating a change of the traveling direction;
a moving object extraction area setting section that sets a moving object extraction area with reference to the position and size of the obstruction by using the position and size of the specified obstruction and the acquired direction change information; and
a collision prediction section that determines whether a collision will occur between the vehicle and the moving object by using the estimated path of the vehicle, the estimated path of the moving object, and the acquired direction change information, when the moving object is recognized in the moving object extraction area based on the information obtained from the first sensor, wherein
the moving object extraction area setting section sets, after the change of the traveling direction indicated by the direction change information, as the moving object extraction area, an area having a shape,
the shape having a first side and a second side,
the first side extending from a third point to a fourth point,
the third point being away from a center of a front side end face of the obstruction by a predetermined third distance in a direction opposite to the traveling direction,
the center of the front side end face of the obstruction being defined in a direction orthogonal to the traveling direction,
the fourth point being away from the third point by a predetermined fourth distance so as to be away from the path of the vehicle in the direction orthogonal to the traveling direction,
the second side extending from a fifth point to the fourth point, and
the fifth point being away from the fourth point by a predetermined fifth distance in the traveling direction.

2. The collision prediction apparatus according to claim 1, wherein
when the traveling direction indicated by the direction change information does not change, the moving object extraction area setting section sets, as the moving object extraction area, an area having, in plan view, a rectangular shape, the rectangular shape having has a third side and a fourth side,
the third side extending from the center of the front side end face of the obstruction to a first point,
the center of the front side end face of the obstruction being defined in a direction orthogonal to the traveling direction,
the first point being away from the center of the front side end face of the obstruction by a predetermined first distance so as to approach the path of the vehicle in the direction orthogonal to the traveling direction,
the fourth side extending from the center of the front side end face of the obstruction to a second point, and
the second point being away from a rear end of the obstruction in the traveling direction by a second distance.

3. The collision prediction apparatus according to claim 1, wherein
even when the moving object is recognized in an area different from the moving object extraction area based on the information obtained from the first sensor, the collision prediction section determines whether a collision will occur, and in response to the moving object being recognized in the moving object extraction area, the collision prediction section determines whether a collision will occur by using the path of the moving object estimated based on the information obtained from the first sensor during a time period shorter than that when the moving object is recognized in an area different from the moving object extraction area.

4. The collision prediction apparatus according to claim 1, wherein as the path of the vehicle or a path of the vehicle after the change of the traveling direction indicated by the direction change information is closer to the obstruction, it is determined whether a collision will occur by using the path of the moving object estimated based on the information obtained from the first sensor during a shorter time period.

5. The collision prediction apparatus according to claim 1, wherein the vehicle includes a second sensor that detects at least one of a steering wheel angle, a tire steering angle, and a yaw rate, and the direction change information acquisition section acquires the direction change information based on a value obtained from the second sensor.

6. The collision prediction apparatus according to claim 1, wherein the direction change information acquisition section obtains information indicating an operating state of a direction indicator installed in the vehicle, and acquires the direction change information based on the obtained information.

7. The collision prediction apparatus according to claim 1, wherein the vehicle includes map information, and the direction change information acquisition section specifies a type of a road in which the vehicle runs based on the map information, and acquires the direction change information based on the specific type of the road.

8. The collision prediction apparatus according to claim 1, wherein the vehicle includes an imaging section, and the direction change information acquisition section acquires the direction change information based on a type of a sign painted on a road in an image obtained by the imaging section installed in the vehicle.

9. The collision prediction apparatus according to claim 1, wherein in response to changing the traveling direction indicated by the direction change information to the direction in which the vehicle passes through a front side of the front side end face of the obstruction, the moving object extraction area setting section sets, as the moving object extraction area, an area having, in plan view, a rectangular shape that has the first side extending from the third point to the fourth point, and the second side extending from the fifth point to the fourth point.

10. A collision prediction method for predicting a collision between a moving object and a vehicle, the method comprising:

estimating a path of the vehicle;

estimating a path of the moving object based on information obtained from a first sensor in time series and used for recognizing the moving object;

specifying a position and size of an obstruction present in a traveling direction of the vehicle with respect to the vehicle;

acquiring direction change information indicating a change of the traveling direction;

setting a moving object extraction area by using the position and size of the obstruction and the acquired direction change information; and determining whether a collision will occur between the vehicle and the moving object by using the estimated path of the vehicle and the estimated path of the moving object, when the moving object is recognized in the moving object extraction area based on the information obtained from the first sensor, wherein the setting the moving object extraction area includes setting, after the change of the traveling direction indicated by the direction change information, as the moving object extraction area, an area having a shape, the shape having a first side and a second side, the first side extending from a third point to a fourth point, the third point being away from a center of a front side end face of the obstruction by a predetermined third distance in a direction opposite to the traveling direction, the center of the front side end face of the obstruction being defined in a direction orthogonal to the traveling direction, the fourth point being away from the third point by a predetermined fourth distance so as to be away from the path of the vehicle in the direction orthogonal to the traveling direction, the second side extending from a fifth point to the fourth point, and the fifth point being away from the fourth point by a predetermined fifth distance in the traveling direction.

11. The collision prediction method according to claim 10, wherein for a state in which the traveling direction indicated by the direction change information does not change, setting, as the moving object extraction area, an area having, in plan view, a rectangular shape, the rectangular shape having has a third side and a fourth side, the third side extending from the center of the front side end face of the obstruction to a first point, the center of the front side end face of the obstruction being defined in a direction orthogonal to the traveling direction, the first point being away from the center of the front side end face of the obstruction by a predetermined first distance so as to approach the path of the vehicle in the direction orthogonal to the traveling direction, the fourth side extending from the center of the front side end face of the obstruction to a second point, and the second point being away from a rear end of the obstruction in the traveling direction by a second distance.

* * * * *